US008156483B2

(12) United States Patent
Berg et al.

(10) Patent No.: US 8,156,483 B2
(45) Date of Patent: *Apr. 10, 2012

(54) METHOD AND SYSTEM FOR DETECTING VULNERABILITIES IN SOURCE CODE

(75) Inventors: Ryan J. Berg, Sudbury, MA (US); Larry Rose, Chelmsford, MA (US); John Peyton, Arlington, MA (US); John J. Danahy, Canton, MA (US); Robert Gottlieb, Westford, MA (US); Chris Rehbein, Watertown, MA (US)

(73) Assignee: International Business Machines Corporation, Armonk, NY (US)

( * ) Notice: Subject to any disclaimer, the term of this patent is extended or adjusted under 35 U.S.C. 154(b) by 936 days.

This patent is subject to a terminal disclaimer.

(21) Appl. No.: 12/163,398

(22) Filed: Jun. 27, 2008

(65) Prior Publication Data

US 2008/0263525 A1 Oct. 23, 2008

Related U.S. Application Data

(63) Continuation of application No. 11/762,475, filed on Jun. 13, 2007, now Pat. No. 7,398,517, which is a continuation of application No. 10/825,007, filed on Apr. 15, 2004, now Pat. No. 7,240,332.

(60) Provisional application No. 60/464,019, filed on Apr. 18, 2003.

(51) Int. Cl.
*G06F 9/45* (2006.01)

(52) U.S. Cl. ........ 717/152; 717/143; 717/153; 717/154; 717/155

(58) Field of Classification Search ........................ None
See application file for complete search history.

(56) References Cited

U.S. PATENT DOCUMENTS

| 5,440,723 | A | 8/1995 | Arnold et al. |
|---|---|---|---|
| 6,247,171 | B1 | 6/2001 | Yellin et al. |
| 6,343,371 | B1 | 1/2002 | Flanagan et al. |
| 6,412,071 | B1 | 6/2002 | Hollander et al. |
| 6,827,009 | B2 | 12/2004 | Koivukunnas et al. |
| 6,973,417 | B1 | 12/2005 | Maxwell, III et al. |
| 7,051,322 | B2 | 5/2006 | Rioux |
| 2003/0172293 | A1 | 9/2003 | Johnson et al. |
| 2003/0182572 | A1 | 9/2003 | Cowan et al. |
| 2004/0111713 | A1 | 6/2004 | Rioux |

(Continued)

FOREIGN PATENT DOCUMENTS

EP 1079303 2/2001

OTHER PUBLICATIONS

"Splint Manual," Version 3.0.6, University of Virginia, pp. 1-119, Feb. 11, 2002.

(Continued)

*Primary Examiner* — Chuck Kendall
(74) *Attorney, Agent, or Firm* — Holland & Knight LLP; Brian J Colandreo, Esq.; V. Raman Bharatula, Esq.

(57) ABSTRACT

A method and system of detecting vulnerabilities in source code. Source code is parsed into an intermediate representation. Models (e.g., in the form of lattices) are derived for the variables in the code and for the variables and/or expressions used in conjunction with routine calls. The models are then analyzed in conjunction with pre-specified rules about the routines to determine if the routine call posses one or more of pre-selected vulnerabilities.

4 Claims, 11 Drawing Sheets

U.S. PATENT DOCUMENTS

2004/0168078 A1  8/2004  Brodley et al.
2005/0015752 A1  1/2005  Alpern et al.

OTHER PUBLICATIONS

"The Java Language Environment," White Paper, Sun Microsystems, Inc. (1997).
Aho, et al., "Principles of Compiler Design," Addison-Wesley Publishing Co., Mar. 1978.
Ashcraft, et al., "Using Programmer-Written Compiler Extensions to Catch Security Holes", IEEE Symposium on Security and Privacy, Oakland, CA, May 2002.
Banatre, et al., "Mechanical Proofs of Security Properties," Institut de Recherche en Informatique et Systemes Aleatoires, Centre National de la Recherche Scientifique (URA 227) Universite de Rennes 1, Insa de Rennes, France, ISSN 1166-8687, Publication Interne No. 825, May 1994.
Bishop and Dilger, "Checking for Race Conditions in File Accesses," Computing Systems 9(2), pp. 131-152 (manuscript version: 20 pages) (1996).
Bush, et al., "A Static Analyzer for Finding Dynamic Programming Errors", Software—Practice and Experience, vol. 30, No. 7, 2000.
Chess, et al., "Improving Computer Security Using Extended Static Checking," IEEE Symposium on Security and Privacy (May 2002).
Chess, et al., "Static Analysis for Security," IEEE Computer Society, IEEE Security and Privacy, 1540-7993 (2004).
Choi, et al., "Static Datarace Analysis for Multithreaded Object-Oriented Programs," IBM, RC22146 (W0108-016), pp. 1-18 (Aug. 9, 2001).
Detlefs, et al., "Extended Static Checking," Technical Report 159, Compaq Systems Research Center (1998).
Dijkstra, E.W., "Guarded Commands, Nondeterminacy and Formal Derivation of Programs," Communications of the ACM, vol. 18, No. 8, pp. 453-457 (Aug. 1975).
Dor, et al., "Cleanness Checking of String Manipulations in C Programs via Integer Analysis", 8th International Symposium on Static Analysis (SAS), pp. 194-212, Jul. 2001.
Dor, et al., "CSSV: Towards a Realistic Tool for Statically Detecting All Buffer Overflows in C", PLDI '03, San Diego, California, Jun. 9-11, 2003.
European Examination Report, European Patent Application No. 04759886.7, Dec. 15, 2008 (5 pages).
Evans and Larochelle, "Improving Security Using Extensible Lightweight Static Analysis," IEEE Software, vol. 19, Issue 1, pp. 42-51, Jan.-Feb. 2002.
First Examination Report, Indian Patent Application No. 2038/KOLNP/2005, Oct. 23, 2008 (2 pages).
Foster, et al., "A Theory of Type Qualifiers", Programming Language Design and Implementation (PLDI'99), pp. 192-203, Atlanta, GA, May 1999.
Frailey, D.J., "An Intermediate Language for Source and Target Independent Code Optimization," ACM, 0-89791-002-8/79/0800-0188, pp. 188-200 (1979).
Ganapathy, et al., "Buffer Overrun Detection Using Linear Programming and Static Analysis", CCS '03, Washington, DC, Oct. 27-30, 2003.
Gordon, et al., "Typing a Multi-Language Intermediate Code," Technical Report MSR-TR-2000-106, Microsoft Research, Microsoft Corporation (Dec. 2000).
Haugh, et al., "Testing C Programs for Buffer Overflow Vulnerabilities", Proceedings of the 2003 Symposium on Networked and Distributed System Security (SNDSS 2003), Feb. 2003.
Kiriansky, et al., "Secure Execution Via Program Shepherding," 11th UESNIX Security Symposium (Security '02), San Francisco, CA (Aug. 2002).
Larochelle and Evans, Statically Detecting Likely Buffer Overflow Vulnerabilities, Proceedings of the 2001 USENIX Security Symposium, Aug. 2001.
Larus, et al., "Righting Software", IEEE Software, pp. 92-100, May/Jun. 2004.
Leino, et al., "Checking Java Program via Guarded Commands," Technical Report Feb. 1999, Compaq Systems Research Center (May 1999).
Lhee, et al., "Type-Assisted Dynamic Buffer Overflow Detection", 11th USENIX Security Symposium, pp. 81-88, Aug. 2002.
Macrakis, S., "From UNCOL to ANDF: Progress in Standard Intermediate Languages," Open Software Foundation, macrakis@osf.org, pp. 1-18 (1993).
Pincus, J., "Steering the Pyramids—Tools, Technology, and Process in Engineering at Microsoft," Microsoft Research (Oct. 5, 2002).
Poll E et al. "Formal specification of the JavaCard API in JML: the APDU class" Computer Networks, Elsevier Science Publishers, vol. 36, No. 4, Jul. 16, 2001 (pp. 407-421).
Rugina, et al., "Symbolic Bounds Analysis of Pointers, Array Indices, and Accessed Memory Regions", ACM Transactions of Programming Languages and Systems, vol. 27, No. 2, pp. 185-234, 2005.
Schneider, F.B., "Enforceable Security Policies," ACM Transactions on Information and System Security, vol. 3, No. 1, pp. 30-50 (Feb. 2000).
Shankar, et al., "Detecting Format String Vulnerabilities with Type Qualifiers", Proceedings of the 10th USENIX Security Symposium, Washington, DC, Aug. 2001.
Simon, et al., "Analyzing String Buffers in C", International Conference on Algebraic Methodology and Software Technology (H. Krichner and C. Ringeissen, Eds.), vol. 2422 of Lecture Notes in Computer Science (Springer), pp. 365-379, Sep. 2002.
Sirer, et al., "An Access Control Language for Web Services," SACMAT '02, Jun. 3-4, 2002, Monterey, CA, ACM 1-58113-496-7/02/0006, pp. 23-30 (2002).
Suzuki, et al., "Implementation of an Array Bound Checker," Defense Advanced Research Projects Agency (Contract FF44620-73-C-0034), Air Force Office of Scientific Research (Contract DAHC-15-72-C-0308), University of Tokyo Computation Center, pp. 132-143, 1997.
Viega, et al., "ITS4: A Static Vulnerability Scanner for C and C++ Code," Proceedings of The Annual Computer Security Applications Conference (2000).
Wagner, et al., "A First Step Toward Automated Detection of Buffer Overrun Vulnerabilities," Proceedings of the Network and Distributed System Security Symposium, University of California, Berkeley, Feb. 2000.
Xie, et al., "ARCHER: Using Symbolic, Path-sensitive Analysis to Detect Memory Access Errors", ESEC/FSE '03, Helsinki, Finland, Sep. 1-5, 2003.
Xu, et al., "An Efficient and Backwards-Compatible Transformation to Ensure Memory Safety of C Programs", SIGSOFT '04/FSE-12, Newport Beach, CA, Oct. 31-Nov. 6, 2004.
Zovi, D.D., "Security Applications of Dynamic Binary Translation, Thesis," The University of New Mexico (2002).

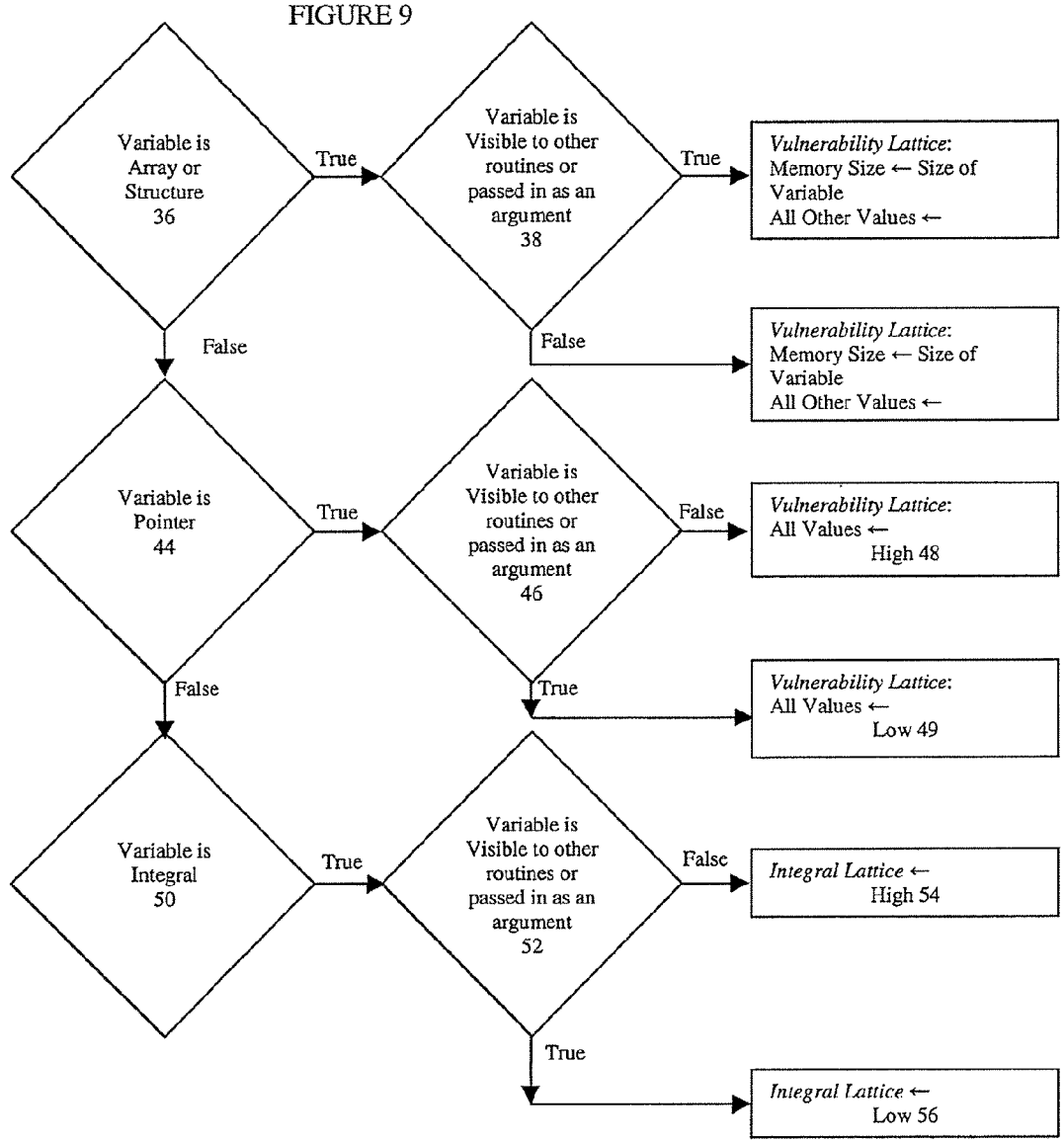

METHOD AND SYSTEM FOR DETECTING VULNERABILITIES IN SOURCE CODE

CROSS-REFERENCE TO RELATED APPLICATIONS

This application is a continuation of and claims priority under 35 U.S.C. §120 to U.S. patent application Ser. No. 11/762,475, filed on Jun. 13, 2007, entitled Method and System for Detecting Vulnerabilities in Source Code, which is a continuation of and claims priority to U.S. patent application Ser. No. 10/825,007, filed on Apr. 15, 2004, entitled Method and System for Detecting Vulnerabilities in Source Code, which claims the benefit under 35 U.S.C. §119(e) to U.S. Provisional Patent Application No. 60/464,019, filed on Apr. 18, 2003, entitled Multi-Language Security Assessment and Intermediary Security Assessment, both of which are incorporated herein by reference in their entirety.

This application is related to co-pending U.S. patent application Ser. No. 10/824,685, filed on Apr. 15, 2004, entitled Method and System for Detecting Race Condition Vulnerabilities in Source Code, and co-pending U.S. patent application Ser. No. 10/824,684, filed on Apr. 15, 2004, entitled Method and System for Detecting Privilege Escalation Vulnerabilities in Source Code.

BACKGROUND

1. Field of the Invention

The invention relates to computer system security and more particularly to a method and system that detects computer source code vulnerabilities, which may pose security risks.

2. Discussion of Related Art

One of the problems associated with developing computer programs is the difficulty in detecting "vulnerabilities" in the programs. As used herein, the term "vulnerability" refers to a section of user source code which, when executed, has the potential to allow external inputs to cause improper or undesired execution. Typical vulnerabilities include buffer overflow; race conditions; and privilege escalation, each of which poses a vulnerability to the desired, controlled execution of the program. Reviewing source code for vulnerabilities is a difficult, time-consuming process. It requires a full understanding of all potential vulnerabilities, how to spot them, and how to fix them.

Prior methods of detecting vulnerabilities in source code include conducting a lexical analysis of the source code. This involves conducting a search of well-known vulnerabilities and pointing them out as potential vulnerabilities. A problem with this method is that it generates too many false positives. Another method involves conducting a manual, line-by-line analysis of the code. However, this method is very labor intensive.

SUMMARY OF THE INVENTION

The invention provides a method and system for detecting vulnerabilities in source code.

Under one aspect of the invention, a method and system of detecting vulnerabilities in source code is provided which includes the steps of analyzing variables in the source code and creating models therefrom in which each model specifies pre-determined characteristics about each variable; using the variable models to create models of arguments to routine calls in the source code; and using the argument models in conjunction with pre-specified criteria for the corresponding routine calls to determine whether the routine calls possess vulnerabilities as a consequence of the arguments and known routine behavior.

BRIEF DESCRIPTION OF THE DRAWINGS

In the Drawing,

FIG. 9 shows a flow chart of the steps performed by the Flow-Insensitive Analysis according to one embodiment of the present invention;

DETAILED DESCRIPTION

Preferred embodiments of the present invention provide a method and system for detecting vulnerabilities in source code. The term "vulnerability," as used herein, refers to a section of user source code which, when executed, has the potential to allow external inputs to cause improper or undesired execution.

Preferred embodiments of the present inventions provide a method and system for detecting vulnerabilities such as buffer overflow, race condition and privilege escalation.

Figure 13:
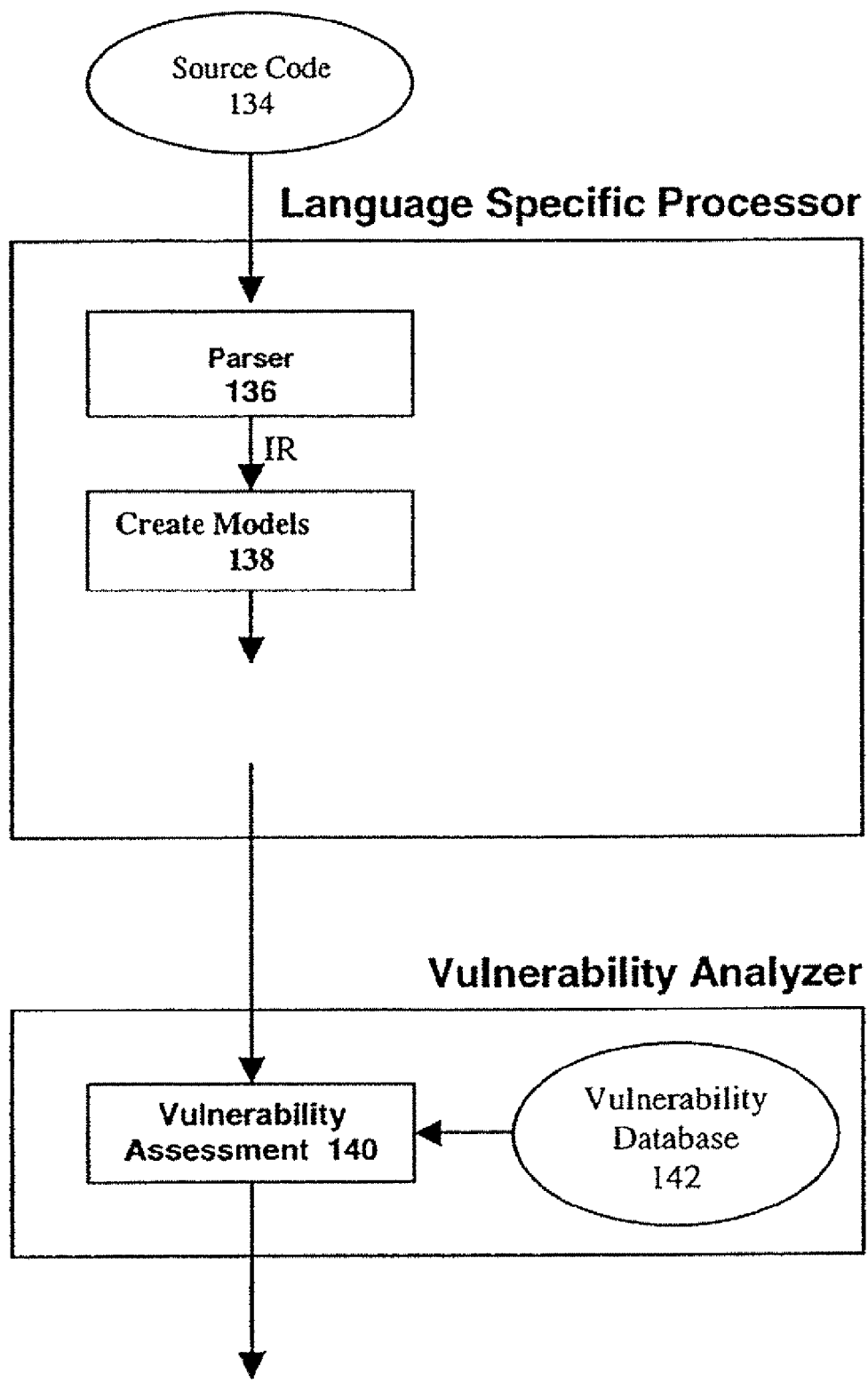
FIG. 13 shows a flow chart of the steps of the system and method of one embodiment of the present invention.

FIG. 13 is a flow chart depicting exemplary logic for analyzing computer programs to detect vulnerabilities such as buffer overflow, race conditions and privilege escalation. The processing has two basic blocks: language specific processing and vulnerability analysis. The language specific processing analyzes the source code and creates models. The language specific processing begins with a language parser 136 receiving the source code 134 to be analyzed and creating an intermediate representation (IR) therefrom. IRs are known in the art and thus the parsing logic is not described here. Models 138 are created to describe certain characteristics of the source code, and the models are used in conjunction with a vulnerability database 142 in a vulnerability assessment 140 to determine whether a vulnerability exists.

Figure 1:
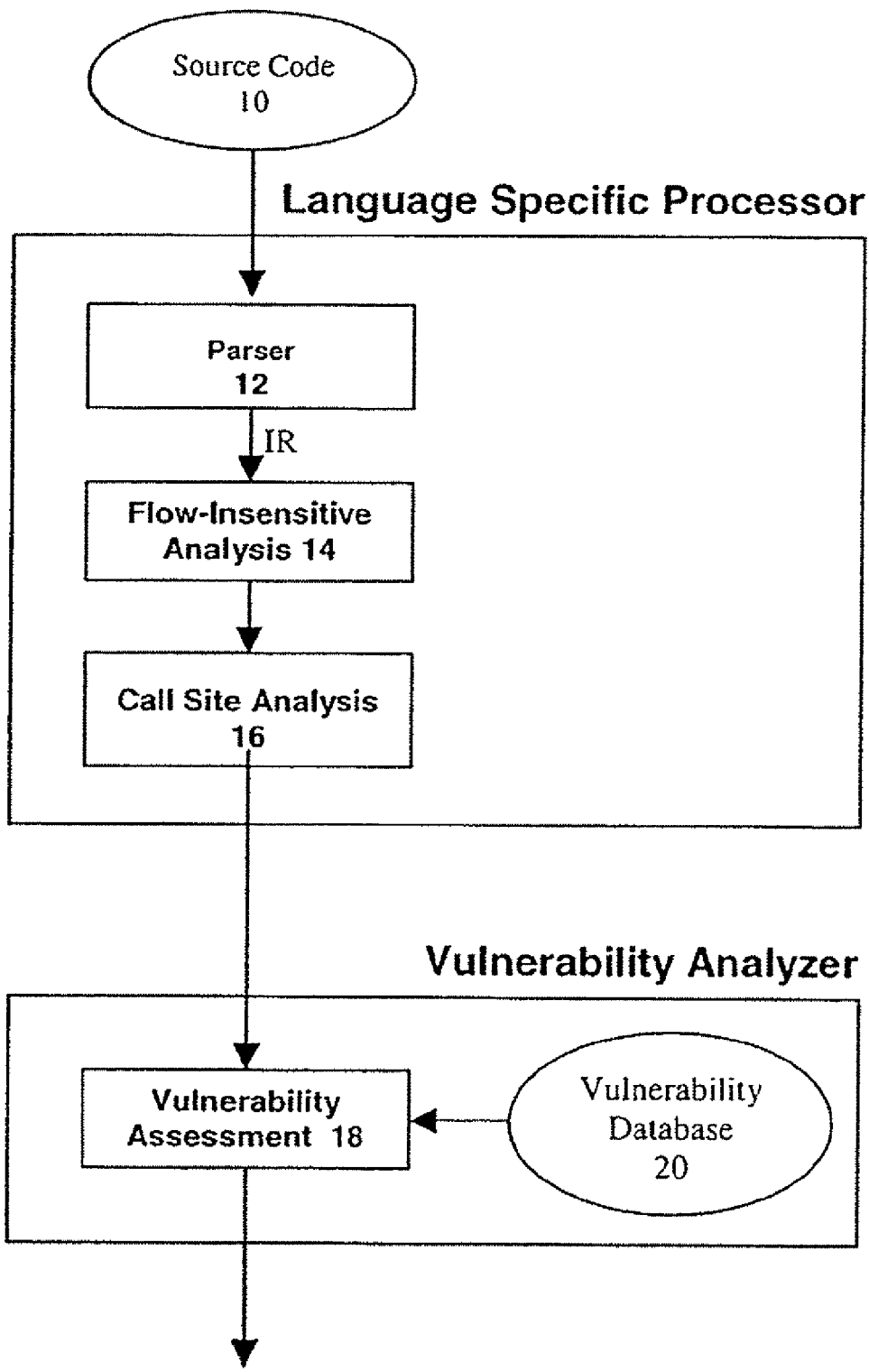
FIG. 1 shows a flow chart of the steps of the system and method of one embodiment of the present invention.

FIG. 1 is a flow chart depicting exemplary logic for analyzing computer programs for buffer overflow vulnerabilities according to certain embodiments of the invention. The processing has two basic blocks: language specific processing and vulnerability analysis.

The language specific processing analyzes the source code and models the arguments used to call select procedures, functions or routines. The models use a unique structure called a "vulnerability lattice." The vulnerability lattice is used to specify, certain relevant information about the argument (whether a variable or expression) such as its memory size, its memory type, etc. This lattice specification is language independent.

The vulnerability analysis uses the vulnerability lattices and other information to analyze the affects of such routine calls with such arguments. This analysis is language independent. The analysis applies rules to determine whether a given routine call in the source code, including the arguments used in such call, pose an inherent vulnerability or risk for certain types of errors. For example, the analysis may determine that a certain routine call with certain arguments at a given location in the source code creates a potential for a buffer overflow error.

Figure 2:
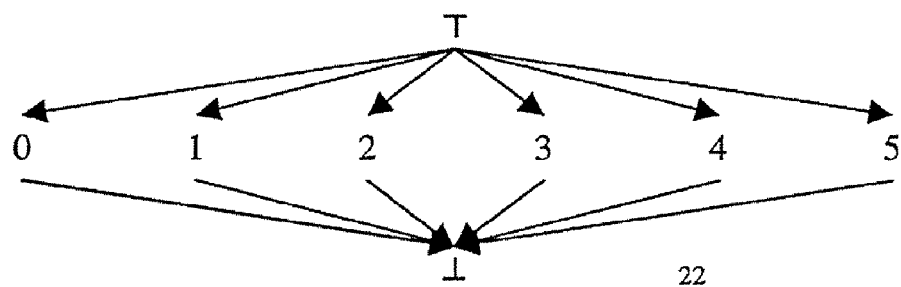
FIG. 2 shows an example of an integral lattice.

Both the language specific processing and the vulnerability assessment utilize lattice structures to model and analyze the variables and expressions that may be used as arguments to routines. By way of background, a lattice represents a refinement of knowledge about the value of an entity. FIG. 2 shows an example of an integral lattice 22 for an integer value. The top value (⊤) at the top of the lattice represents no knowledge of the value. The bottom value (⊥) at the bottom of the lattice represents an unknown value (i.e., no resolution about which of the possible values should be applied). The value(s) between the top value and the bottom value represent the possible value(s) of the entity. In the integral lattice 22 shown in FIG. 2, the integers 0, 1, 2, 3, 4 and 5 are the possible values for the entity.

Language Specific Processing to Create Vulnerability Lattices for Arguments to Select Routines The language specific processing begins with a language parser 12 receiving the source code 10 to be analyzed and creating an intermediate representation (IR) therefrom.

A flow-insensitive analysis 14 analyzes the IR and derives models about each variable in the code. These models are specified in lattice form and called vulnerability lattices. (Lattices in general are known.) Under preferred embodiments a vulnerability lattice (sometimes referred to as an "expression lattice" as well in the paragraphs below) includes a number of other lattices to describe important characteristics of a variable or expression (depending on whether the vulnerability lattice is associated with a variable or expression). More specifically, the vulnerability lattices provide information about the following:
  memory size;
  data size;
  whether data is null terminated;
  the kind of memory contained in a block of memory;
  the constant string value or values for a block of memory; and
  the origin of data.

When determining how a lattice should be set or modified the flow-insensitive analysis logic applies pre-determined merger rules for the various lattice types. This is used, for example, when analyzing expressions.

The flow-insensitive analysis logic also utilizes integral lattices to describe (again in lattice form) integral type variables.

Figure 3:
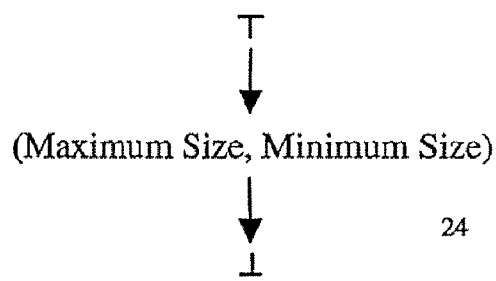
FIG. 3 shown an example of a memory size lattice.

FIG. 3 depicts an example of a memory size lattice 24. Memory size lattice 24 is a lattice consisting of the values high, low, and a pair of non-negative integral values, indicating the possible range of sizes of a block of memory, either directly or referenced via a pointer. This lattice may be used to determine if certain memory operations will overflow the available memory. The merge rules for the memory size lattice 24 are as follows:
  a merge of a high value (⊤) and any other value will result in the other value;
  a merge of a low value (⊥) and any other value will result in a low value; and
  a merge of two memory range lattice values will result in the following:
    range maximum←$range_1$ maximum⌈$range_2$ maximum (⌈ is the "maximum of" operator)
    range minimum←$range_1$ minimum⌊$range_2$ minimum (⌊ is the "minimum of" operator)
  For example, an array declared in c or c++ as
  char a[100];
  would have a size of 100 bytes, that being the size of 1 entry (1 byte) multiplied by the number of elements in the array (100).

As another example, a memory size lattice representing a range of size values could be useful:
  char a[100];
  char b[200];
  char *c=(i==0) ? a:b;
The size of the block of memory pointed to by the variable c in this case could be either 100 bytes or 200 bytes, depending on whether the array a or the array b is selected, which in turn depends on whether another variable i is 0. The memory size lattice result for this variable would specify a maximum size of 200 and a minimum of 100 bytes.

Figure 4:
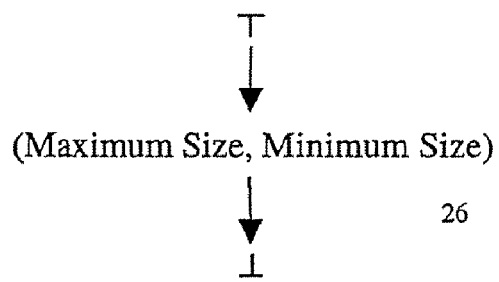
FIG. 4 shows an example of a data size lattice.
Figure 5:
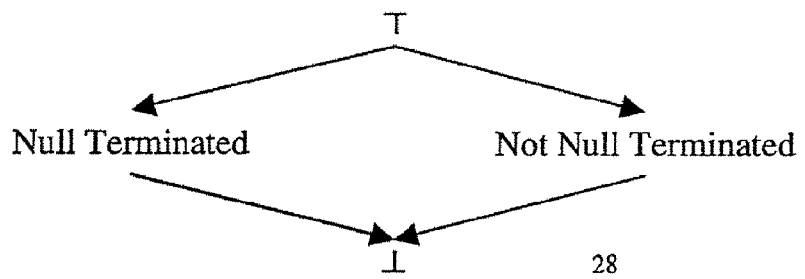
FIG. 5 shows an example of a null terminated lattice.

FIG. 4 depicts an example of a data size lattice 26. A data size lattice indicates the possible range of sizes of the known data within a block of memory, either directly or referenced via a pointer. This lattice may be used to determine if certain memory operations will overflow the available memory. In particular, it is generally used to indicate the size of a null terminated string, which may be shorter than the block of memory in which it is contained. The merge rules for the data size lattice 26 are as follows:
  a merge of a high value (⊤) and any other value will result in the other value;
  a merge of a low value (⊥) and any other value will result in a low value; and
  a merge of two memory range lattice values will result in the following:
    range maximum←$range_1$ maximum⌈$range_2$ maximum
    range minimum←$range_1$ minimum⌊$range_2$ minimum
  FIG. 5 depicts an example of a null terminated lattice 28. A null terminated lattice indicates whether or not the data is known to be null terminated, e.g., has a 0 value as the last entry to indicate the end of the data. It is typically used in connection with string structures. The range of data includes specifying that it is null terminated or is not null terminated. The merge rules for the null terminated lattice are as follows:
  a merge of a high value (⊤) and any other value will result in the other value;
  a merge of a low value (⊥) and any other value will result in a low value;
  a merge of two identical non-high, non-low lattice values will result in the same lattice value; and
  a merge of two different non-high, non-low lattice values will result in the low (⊥) lattice value.

Figure 6:
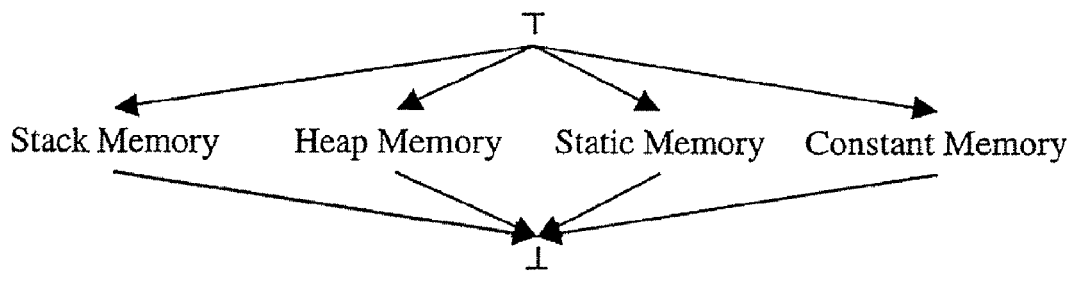
FIG. 6 shows an example of a memory location lattice.

FIG. 6 depicts an example of a memory location lattice 30. A memory location lattice indicates the kind of memory that the block of memory is contained within, e.g., stack memory, heap memory, static memory, and constant memory. Other kinds of memory may also be specified. The merge rules for the memory location lattice 30 are as follows:

- a merge of a high value (⊤) and any other value will result in the other value;
- a merge of a low value (⊥) and any other value will result in a low value;
- a merge of two identical non-high, non-low lattice values will result in the same lattice value; and
- a merge of two different non-high, non-low lattice values will result in the low (⊥) lattice value.

Figure 7:
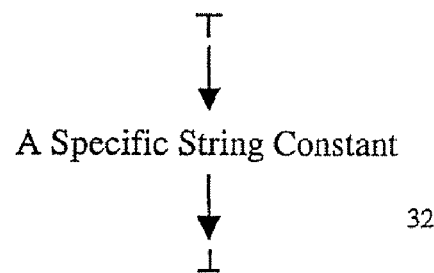
FIG. 7 shows an example of a string value lattice.

FIG. 7 depicts an example of a string value lattice 32. A string value lattice indicates the constant string value or values for the block of memory. The merge rules for a string value lattice are as follows:

- a merge of a high value (⊤) and any other value will result in the other value;
- a merge of a low value (⊥) and any other value will result in a low value;
- a merge of two identical constant strings will result in that constant string as the lattice value; and
- a merge of two different constant strings will result in the low (⊥) lattice value.

Figure 8:
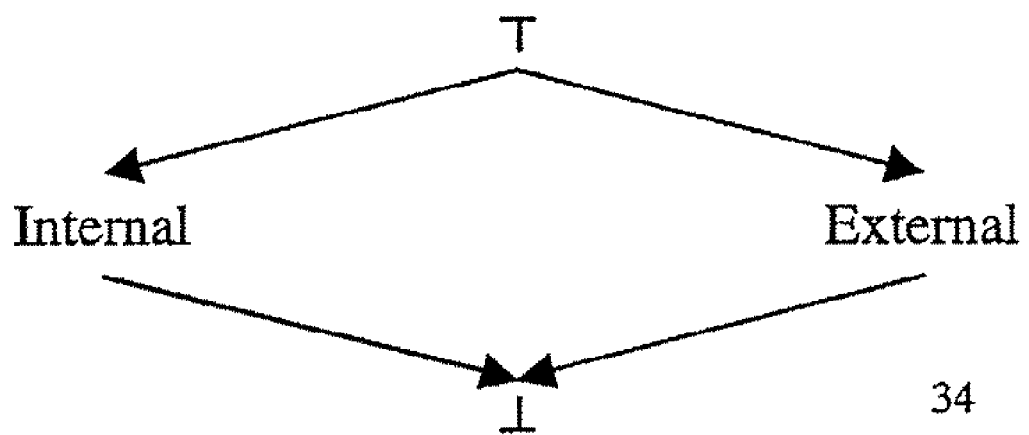
FIG. 8 shows an example of a data origin lattice.

FIG. 8 depicts an example of a data origin lattice 34. A data origin lattice indicates the origin of the data, e.g., specifying that the data is internally generated (relative to the analyzed routine) or whether it is externally generated. Data of an unknown origin will have the low value. The merge rules for a data origin lattice are as follows:

- a merge of a high value (⊤) and any other value will result in the other value;
- a merge of a low value (⊥) and any other value will result in a low value;
- a merge of two identical non-high, non-low lattice values will result in the same lattice value; and
- a merge of two different non-high, non-low lattice values will result in the low (⊥) lattice value.

A "vulnerability lattice" represents the attributes of a non-integral type variable (or expression). Under preferred embodiments, it incorporates the memory size lattice 24, data size lattice 26, null terminated lattice 28, memory location lattice 30, string value lattice 32, and data origin lattice 34.

FIG. 9 shows a flow chart of the steps performed in the flow-insensitive analysis 14 of preferred embodiments of the invention. The flow-insensitive analysis 14 derives a vulnerability lattice for each non-integral type variable or expression and an integral lattice for each integral type variable or expression. The term expression lattice, as used herein, means either a vulnerability lattice, in the case of a non-integral variable or expression or an integral lattice, in the case of an integral type variable or expression.

The flow begins with an initial test 36 to determine if the variable being analyzed is an array or structure. If so, the variable is associated with a vulnerability lattice. A test is then made in step 38 to determine if the variable is visible to other routines or passed into other routines as an argument.

If the variable is visible to other routines or passed into other routines as an argument, the vulnerability lattice for the variable is set, in step 40, to specify a memory size lattice having a value set to the size of the variable. All other values of the vulnerability lattice are set to low in step 40. Though not shown in the flow chart, if the variable is a constant initialized variable, the data size lattice, null terminated lattice, and string value lattice are set to indicate the initialized value of the variable.

If the variable is not visible to other routines or not passed into other routines as an argument, the memory size lattice is set to a value the size of the variable. All other values in the vulnerability lattice are set, in step 42, to high.

If the results of step 36 are "false" (meaning that the variable is not an array or structure), the flow proceeds to step 44. In step 44, a test is performed to determine whether the variable being analyzed is a pointer. If so, the logic proceeds to step 46 to determine if the pointer variable is visible to other routines, or if it is passed in to other routines as an argument.

If the variable is visible to other routines or passed into other routines as an argument, the pointer variable is associated with a vulnerability lattice and all values of the vulnerability lattice are set to low in step 49.

If the variable is not visible to other routines or not passed into other routines as an argument, the pointer variable is associated with a vulnerability lattice and all values of the vulnerability lattice are set to high in step 48.

If the results of step 44 are "false" (meaning that the variable is not an array or structure or pointer), the flow proceeds to step 50. In step 50 a test is performed to determine whether the variable being analyzed is an integral type variable. Integral type variables are associated with an integral lattice. If so, the logic proceeds to step 52 to determine if the integral variable is visible to other routines, or if it is passed in to other routines as an argument.

If the variable is visible to other routines or passed into other routines as an argument, it is associated with an integral lattice with all values set to low in step 56.

If the variable is not visible to other routines or not passed into other routines as an argument, the value in the integral lattice is set to high in step 54.

After the flow-insensitive analysis 14 derives a vulnerability lattice or integral lattice for each variable in the routine, the flow-insensitive analysis 14 visits each statement in the routine. The visits may be made in any order. Each expression within a statement is visited in such an order that before the expression is processed, all the expressions given as input (i.e., dependencies) to that expression are processed. For example, in the expression $$a=(b+c)+d;$$

the partial, or sub-expressions b and c must be processed before the expression (b+c) is processed. Similarly, the sub-expressions (b+c) and d must be processed before the expression (b+c)+d is processed.

Figure 10A:
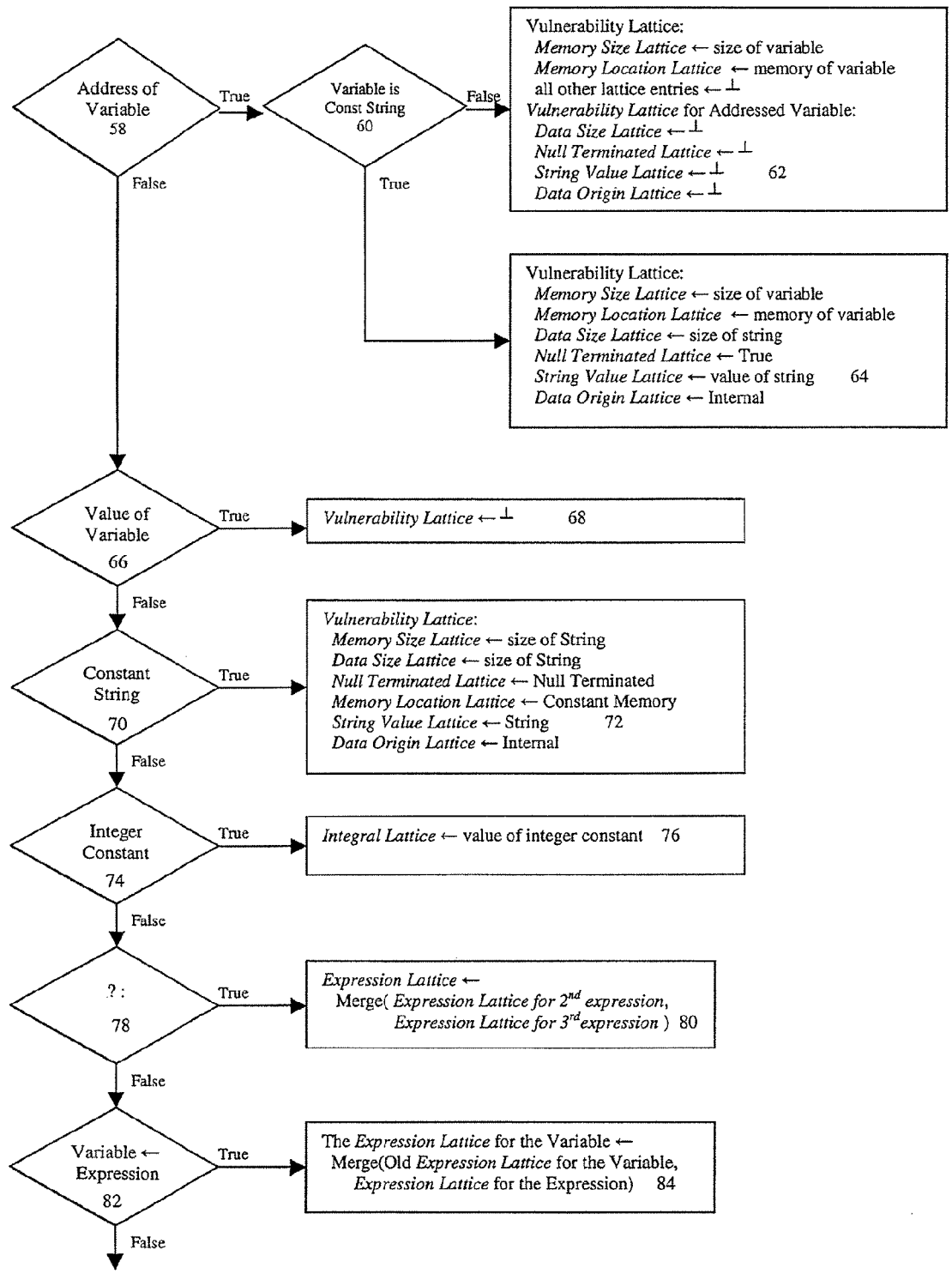
FIGS. 10A-B shows a flow chart of the steps performed in processing expressions according to the Flow-Insensitive Analysis of one embodiment of the invention.
Figure 10B:
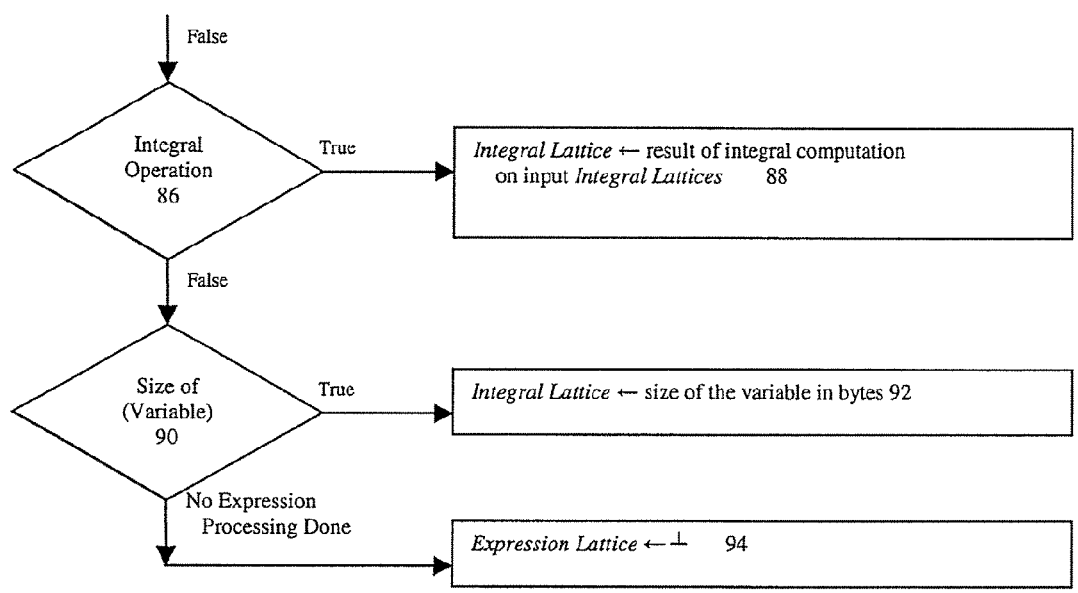

FIGS. 10A-B show a flow chart of the flow-insensitive analysis logic of preferred embodiments for processing each expression in a routine. The flow begins with an initial test 58 to determine if the expression being analyzed is for an address of a variable. If so, in step 60, a test is made to determine if that variable is to an array or structure or to determine if the variable is a constant string. If so, in step 64, a vulnerability lattice is associated with that expression and its memory size lattice is set to the size of the variable, and its memory location lattice is set to the kind of memory of the variable referenced. If the variable has a constant (const) attribute and it is a string, the data size lattice is set to the size of the string and the null terminated lattice is set to null terminated. The string value lattice is set to the value of the string. The data origin lattice is set to specify that the data origin is internal. If the expression is referring to the address of a variable but the variable is not a constant string, then in step 62 a vulnerability lattice is associated with that expression and its memory size lattice set to the size of the variable, and its memory location lattice is set to the kind of memory of the variable referenced. The other lattice entries are set to the low value. In addition, since the variable is address exposed (i.e., a pointer to it exists and it can potentially be modified by any pointer write to the pointer), in step 62 the vulnerability lattice whose address was taken has its data size lattice, null terminated lattice, string value lattice, and data origin lattice set to low (with the memory size lattice and memory location lattice remaining unchanged).

If the results of step 58 are "false" (meaning that the expression is not referring to the address of a variable), the flow proceeds to step 66. In step 66, a test is made to determine if the expression is for a value of a variable. If so, in step 68, a vulnerability lattice is associated with the expression and all lattice entries are set to low.

If the results of step 66 are "false" (meaning that the expression is not referring to the address or value of a variable), the flow proceeds to step 70. In step 70, a test is made to determine if the expression is for a constant string. If so, in step 72 a vulnerability lattice is associated with the expression and its memory size lattice is set to the size of the constant string, including null termination byte; its data size lattice is set to the size of the constant string, including the null termination byte; its null termination lattice is set to indicate that it is null terminated; its memory location lattice is set to indicate constant memory; its string value lattice is set to the contents of the string; and its data origin lattice is set to internal.

If the results of step 70 are "false" (meaning that the expression is not referring to the address or value of a variable and does not refer to a constant string), the flow proceeds to step 74. In step 74, a test is made to determine if the expression is for an integral constant (i.e., an integer). If so, in step 76 an integral lattice is associated with the expression, and its value is set to the integer value.

If the results of step 74 are "false" (meaning that the expression is not referring to the address or value of a variable and does not refer to a constant string or an integral constant), the flow proceeds to step 78. In step 78, a test is made to determine if the expression is a "question mark/colon operation." A question mark/colon operation is of the form <expression$_1$>?<expression$_2$>:<expression$_3$>. If so, in step 80 a vulnerability lattice is associated with the expression and its lattice entries are set to the results from merging the vulnerability lattices of <expression$_2$> and <expression$_3$> (which have been set previously).

If the results of step 78 are "false", the flow proceeds to step 82. In step 82, a test is made to determine if the expression is an assignment operation, i.e., assigning the expression to a variable. If so, in step 84 the expression lattice for the target variable (i.e., the one being assigned) is updated. Specifically, the prior values of the expression lattice are merged with the expression lattice for the expression being assigned to the target variable.

If the results of step 82 are "false", the flow proceeds to step 86. In step 86, a test is made to determine if the expression is for an integral operation. If so, in step 88 the integral value lattices for each input of the operation are used to compute a resulting integral lattice and value for the expression.

If the results of step 86 are "false", the flow proceeds to step 90. In step 86, a test is made to determine if the expression is for a "size of" operation, i.e., of the form size of (<variable or type>). If so, in step 92 an integral lattice is associated with the expression and its value will be the size of the variable (or type).

If the tests for steps 58, 66, 70, 74, 78, 82, 86, and 90 are false, then a default assignment is made in step 94 in which all values of the expression lattice are set to low.

The following examples are exemplary code segments to be analyzed by flow-insensitive analysis logic to determine whether a buffer flow vulnerability exists. Each is followed by a description of how the flow-insensitive analysis logic models the variables and expressions with the various lattices mentioned above.

Example 1

```
void test1(int i) {
    char buf[100];
    char *p;
    switch (i) {
        case 1:
            p = "1";
            break;
        case 2:
            p = "12";
            break;
        default:
            p = "123";
            break;
    }
    strcpy(buf, p);
}
void test1(int i) {
```

An integral lattice for the variable i is created because its declared of "int" type and its integral lattice values are set to low: i←⊥ char buf[100];

A vulnerability lattice is associated with the variable "buf" and because it's an array its memory size lattice is set to the size of the structure: buf←100. Since this variable is local and not visible to other routines or passed as an argument, all other lattices are set high: ←⊤, see step 42 of FIG. 9.

char *p;

A vulnerability lattice is associated with the variable p. Because it is a pointer and it is not visible to other routines or passed as an argument all lattices are set high: ←⊤, see step 48 of FIG. 9.

switch (i) {

The integral lattice for "i" has the value ⊥, see above.

case 1:

p="1";

This is an assignment operation and thus will trigger the logic of steps 82 and 84 of FIGS. 10A-B. Consequently, the expression lattice for the variable being assigned will be the merge results of the prior value of the lattice for the variable (in this case high ⊤) and the expression lattice for the expression being assigned to the variable, in this case the expression "1". The expression "1" has the lattice:

memory size lattice←2
data size lattice←2
null terminated lattice←null terminated
memory location lattice←constant memory
data origin lattice←internal
string value lattice←"1"

The results of the merger rules are used for the vulnerability lattice for p and are as follows:

memory size lattice←2
data size lattice←2
null terminated lattice←null terminated
memory location lattice←constant memory
data origin lattice←internal
string value lattice←"1"

break;

case 2:

p="12";

This too is an assignment operation and thus will trigger the logic of steps 82 and 84 of FIGS. 10A-B. Consequently, the expression lattice for the variable being assigned will be the merge results of the prior value of the lattice for the variable (see above) and the expression lattice for the expression being assigned to the variable, in this case the expression "12". The expression "12" has the lattice memory size lattice←3
    data size lattice←3
    null terminated lattice←null terminated
    memory location lattice←constant memory
    data origin lattice←internal
    string value lattice←"12"

The results of the merger rules are used for the vulnerability lattice for p and are as follows:

memory size lattice←range of 2 to 3
    data size lattice←range of 2 to 3
    null terminated lattice←null terminated
    memory location lattice←constant memory
    data origin lattice←internal
    string value lattice←⊥
      break;
      default:
      p="123";

This too is an assignment operation and thus will trigger the logic of steps 82 and 84 of FIGS. 10A-B. Consequently, the expression lattice for the variable being assigned will be the merge results of the prior value of the lattice for the variable (see above) and the expression lattice for the expression being assigned to the variable, in this case the expression "123". The expression "123" has the lattice memory size lattice←4
    data size lattice←4
    null terminated lattice←null terminated
    memory location lattice←constant memory
    data origin lattice←internal
    string value lattice←"123"

The results of the merger rules are used for the vulnerability lattice for p and are as follows:

memory size lattice←range of 2 to 4
    data size lattice←range of 2 to 4
    null terminated lattice←null terminated
    memory location lattice←constant memory
    data origin lattice←internal
    string value lattice←⊥
    break;
    }
    strcpy(buf, p);

Since the address of buf is implicitly taken for the argument, the logic of step 62 is triggered and the vulnerability lattice for buf is modified to set the data size lattice, memory size lattice, string value lattice and data origin lattice to unknown.

Since the expression p refers to the value of a variable, the logic of step 68 is triggered and all values in the vulnerability lattice of the expression p are set to unknown.

Example 2

```
static char y[100];
void test2(char *z) {
  strcpy(y, z);
}
static char y[100];
```

A vulnerability lattice is associated with array y. Its memory size is set to 100, its memory kind lattice is set to static, and all other lattices are set low: ←⊥. This is done because the variable y is visible to other routines, see step 40 of FIG. 9.

void test2(char *z) {

A vulnerability lattice is associated with pointer variable z. All lattices are set low: ←⊥. This is done because the variable z is passed to other routines as an argument, see step 49 of FIG. 9.

strcpy(y, z);

Since the address of y is implicitly taken for the argument, the logic of step 62 is triggered and the vulnerability lattice for y is modified to set the data size lattice, memory size lattice, string value lattice and data origin lattice to unknown.

Since the expression z refers to the value of a variable, the logic of step 68 is triggered and all values in the vulnerability lattice of the expression z are set to unknown.

After the flow insensitive analysis is performed, the call site analysis logic 16 is invoked. The call site analysis 16 derives vulnerability lattices for each variable or expression argument passed at a call site within the routine being analyzed. (A "call site" is the location within the code where a call is made to a routine.) The arguments may be variables or expressions. Under preferred embodiments, the call site analysis is limited to calls to only select routines, procedures, or functions, as not all routines pose a vulnerability risk.

Under preferred embodiments, the call site analysis 16 requires that each call site be visited; however, this need not be in any specific order. Each argument of the call is analyzed such that any subexpression dependencies are processed first; that is, for example, before an expression making up an argument is processed, all the subexpressions given as input to that expression are processed.

The call site analysis logic is similar to the flow-insensitive analysis logic. However, unlike the flow-insensitive analysis logic, in the call site analysis logic any expression referring to the value of a variable associates the vulnerability lattice for that variable with the expression making such reference. In addition, any assignment operation to a variable does not change the vulnerability lattice for that variable.

Figure 11A:
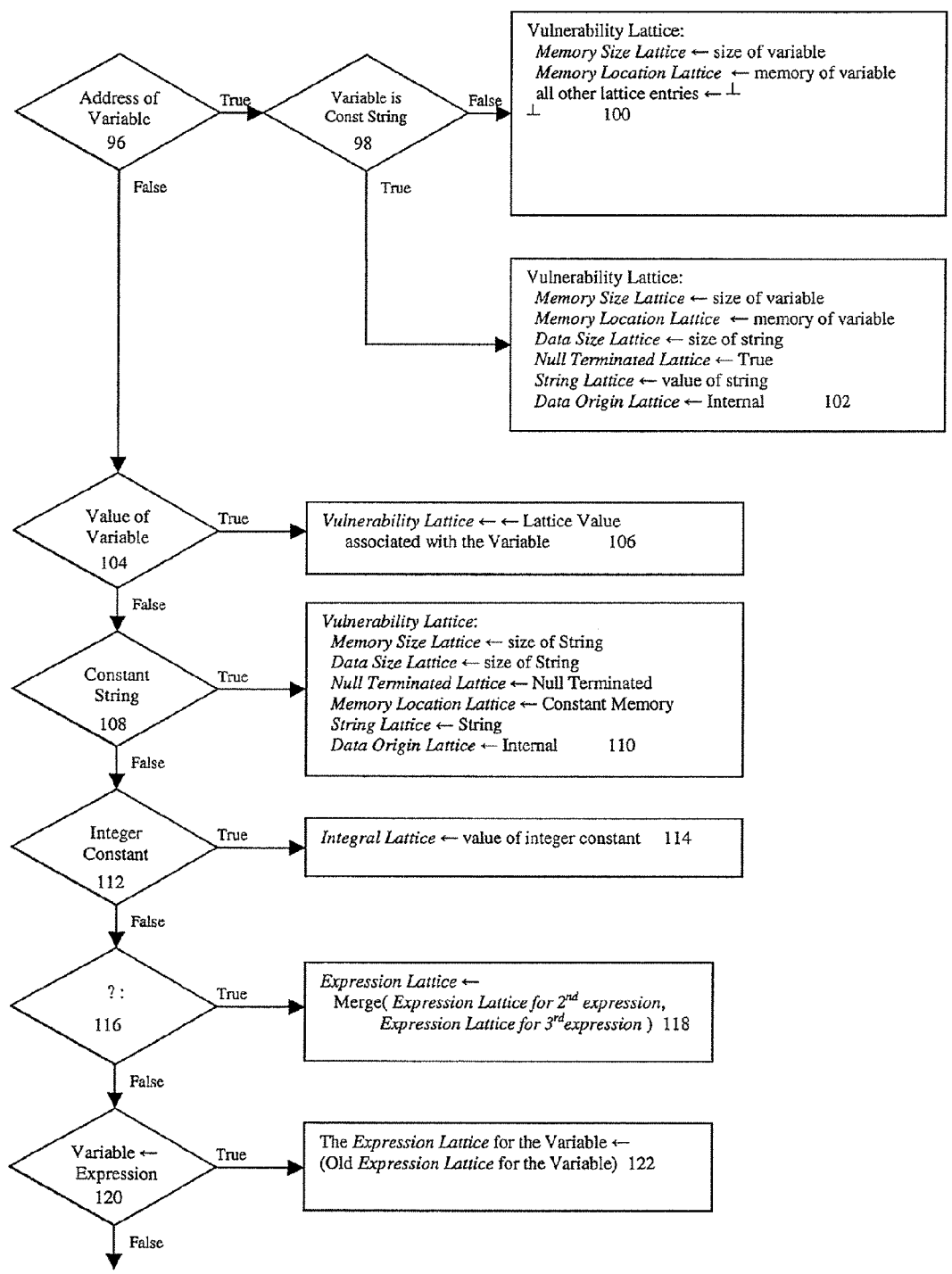
FIGS. 11A-B shows a flow chart of the steps performed in processing expressions according to the Call Site Analysis according to one embodiment of the present invention.
Figure 11B:
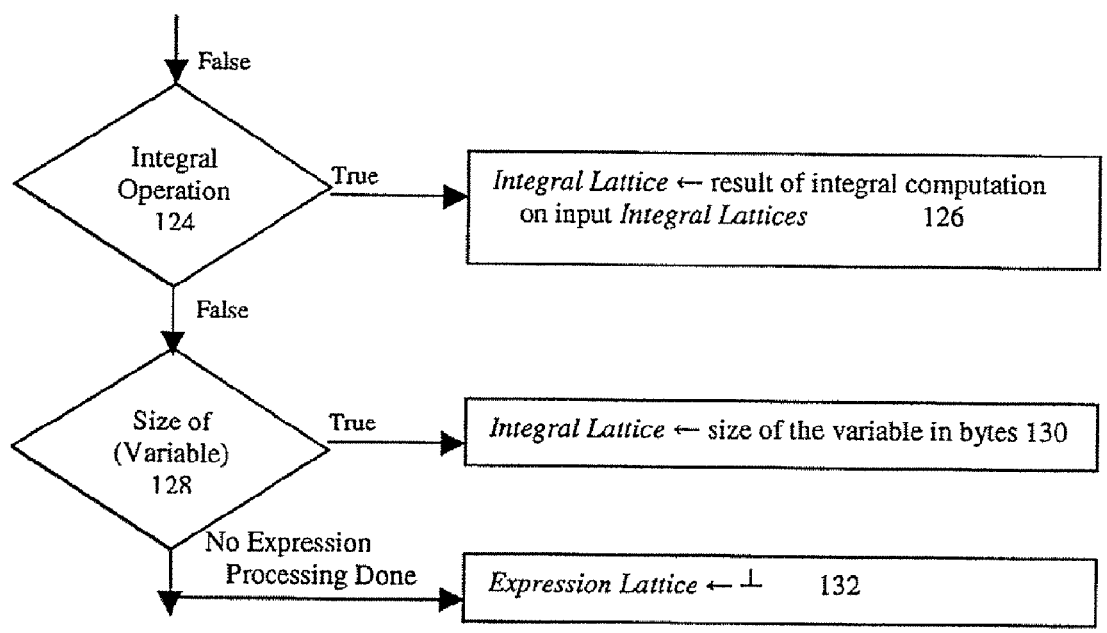

FIGS. 11A-B show a flow chart of the steps performed in analyzing expressions in the call site analysis 16. The flow begins with an initial test 96 to determine if the expression being analyzed is for an address of a variable. If so, in step 98, a test is made to determine if that variable is to an array or structure or to determine if the variable is a constant string. If so, in step 102, a vulnerability lattice is associated with that expression and its memory size lattice is set to the size of the variable, and its memory location lattice is set to the kind of memory of the variable referenced. If the variable has a constant (const) attribute and it is a string, the data size lattice is set to the size of the string and the null terminated lattice is set to null terminated. The string value lattice is set to the value of the string. The data origin lattice is set to specify that the data origin is internal. If the expression is referring to the address of a variable but the variable is not a constant string, then in step 100 a vulnerability lattice is associated with that expression and its memory size lattice set to the size of the variable, and its memory location lattice is set to the kind of memory of the variable referenced. The other lattice entries are set to the low value.

If the results of step 96 are "false", the flow proceeds to step 104. In step 104, a test is made to determine if the expression is for a value of a variable. If so, in step 106, a vulnerability lattice is associated with the expression and all lattice entries are set to lattice values associated with the variable.

If the results of step 104 are "false", the flow proceeds to step 108. In step 108, a test is made to determine if the expression is for a constant string. If so, in step 110 a vulnerability lattice is associated with the expression and its memory size lattice is set to the size of the constant string, including null termination byte; its data size lattice is set to the size of the constant string, including the null termination byte; its null termination lattice is set to indicate that it is null terminated; its memory location lattice is set to indicate constant memory; its string value lattice is set to the contents of the string; and its data origin lattice is set to internal.

If the results of step 108 are "false", the flow proceeds to step 112. In step 112, a test is made to determine if the expression is for an integral constant (i.e., an integer). If so, in step 114 an integral lattice is associated with the expression, and its value is set to the integer value.

If the results of step 112 are "false", the flow proceeds to step 116. In step 116, a test is made to determine if the expression is a "question mark/colon operation." If so, in step 118 a vulnerability lattice is associated with the expression and its lattice entries are set to the results from merging the vulnerability lattices of <expression$_2$> and <expression$_3$> (which have been set previously).

If the results of step 116 are "false", the flow proceeds to step 120. In step 120, a test is made to determine if the expression is an assignment operation, i.e., assigning the expression to a variable. If so, in step 122 the expression lattice for the target variable (i.e., the one being assigned) remains the same as the prior expression lattice for the variable.

If the results of step 120 are "false", the flow proceeds to step 124. In step 124, a test is made to determine if the expression is for an integral operation. If so, in step 126 the integral value lattices for each input of the operation are used to compute a resulting integral lattice and value for the expression.

If the results of step 124 are "false", the flow proceeds to step 128. In step 128, a test is made to determine if the expression is for a "size of" operation. If so, in step 130 an integral lattice is associated with the expression and its value will be the size of the variable (or type).

If the tests for steps 96, 104, 108, 112, 116, 120, 124, and 128 are false, then a default assignment is made in step 94 in which all values of the expression lattice are set to low.

Referring back to the exemplary code segments analyzed in connection with the flow-insensitive analysis logic, the following processing takes place.

Example 1

```
void test1(int i) {
    char buf[100];
    char *p;
    switch (i) {
        case 1:
            p = "1";
            break;
        case 2:
            p = "12";
            break;
        default:
            p = "123";
            break;
    }
    strcpy(buf, p);
}
```

The call to strcpy has its arguments analyzed for lattice values. Argument 1 has the value buf, which has the vulnerability lattice values as follows:
Memory Size Lattice←100,
Data Size Lattice←⊥
Null Terminated Lattice←⊥
String Value Lattice←⊥
Memory Location Lattice←Stack Memory
Data Origin Lattice←⊥
Argument 2 has the value p, which has the vulnerability lattice values as follows:
Memory Size Lattice←range of 2 to 4
Data Size Lattice←range of 2 to 4
Null Terminated Lattice←Null Terminated
String Value Lattice←⊥
Memory Location Lattice←Constant Memory
Data Origin Lattice←Internal
}

Example 2

```
static char y[100];
void test2(char *z) {
    strcpy(y, z);
}
```

This call to strcpy has its arguments analyzed for lattice values. Argument 1 has the value y, which has vulnerability lattice values as follows:
Memory Size Lattice←100,
Data Size Lattice←⊥
Null Terminated Lattice←⊥
String Value Lattice←⊥
Memory Location Lattice←Static Memory
Data Origin Lattice←⊥
Argument 2 has the value z, which has vulnerability lattice values as follows:
Memory Size Lattice←⊥
Data Size Lattice←⊥
Null Terminated Lattice←⊥
String Value Lattice←⊥
Memory Location Lattice←⊥
Data Origin Lattice←⊥
}

According to one embodiment of the invention, the vulnerability lattices are created for those arguments to library call sites that are known to have potential vulnerabilities. The library call sites may be identified in a database 20.

Language Independent Analysis of Vulnerability Lattices at Select Call Sites

Once the vulnerability lattices are created for the arguments to select routine calls, the source code is further analyzed in a language independent manner to determine if the source code has vulnerabilities that should be reported. Preferred embodiments of the invention perform such analysis with vulnerability assessment logic 18 operating in conjunction with a vulnerability database 20.

The vulnerability database 20 is a database containing information about a number of pre-identified routines. Among other things, it specifies the conditions that can cause a vulnerability. The conditions are specified as constraints to a vulnerability lattice for arguments passed to the routine.

The vulnerability assessment logic 18 operates as follows. Each call site in the source code, as analyzed by call site analysis 16, is examined, though this need not be in any specific order. The name of the called routine, and possibly information about its argument types, is used to create a routine lookup name. This routine lookup name is used as a key in the vulnerability database 20 to discover if this call site is potentially vulnerable.

If the lookup fails to discover a corresponding entry, then the call site is determined to be not vulnerable, because the routine name has no known vulnerabilities specified in the database 20.

If the lookup discovers a corresponding entry, then the entry is examined for a list of matching actions, which are rules used to assess a specific call. Those matching actions are supplied in a specific order. Each matching action is compared to the vulnerability lattice for each argument to determine if the vulnerability lattice from the argument matches the requirement of the matching action. As illustrated in the example described below, if a match occurs, then the action reports a vulnerability for the examined call site. The report may then be used by a developer to address the potential vulnerability. Multiple vulnerabilities may be detected for a specific call site.

Referring back to the exemplary code segments analyzed in connection with the language specific processing logic, the following processing takes place in vulnerability assessment.

Example 1

This is the example which had the following language-specific code:
strcpy(buf, p);
The call site analysis for this call yielded the following vulnerability lattice for the first argument buf:
Memory Size Lattice←100,
Data Size Lattice←⊥
Null Terminated Lattice←⊥
String Value Lattice←⊥
Memory Location Lattice←Stack Memory
Data Origin Lattice←⊥
The call site analysis also yielded the following vulnerability analysis for the second argument p:
Memory Size Lattice←range of 2 to 4
Data Size Lattice←range of 2 to 4
Null Terminated Lattice←Null Terminated
String Value Lattice←⊥
Memory Location Lattice←Constant Memory
Data Origin Lattice←Internal
The matching actions returned from the database 20 specify certain rules to be applied in assessing the vulnerability lattices for the call to routine strcpy( ). In the particular case of the call to strcpy the rules check that the first argument has a minimum memory size that is larger than or the same size as the maximum data size for the second argument. In this way, the rules (matching actions) determine whether this specific call creates a risk of buffer overflow. In this case, no overflow is possible given the effectively semantic analysis of the source code involved.

The minimum memory size for argument 1 (100) is greater than or equal to the maximum data size for argument 2 (4), so the buffer cannot overflow. The data origin for argument 2 is internal, so it cannot be a vulnerability. The call is not marked as a vulnerability.

Example 2

This is the example which had the following language-specific code:
strcpy(y, z);

The call site analysis for this call yielded the following vulnerability lattice for the first argument y:
Memory Size Lattice←100,
Data Size Lattice←⊥
Null Terminated Lattice←⊥
String Value Lattice←⊥
Memory Location Lattice←Static Memory
Data Origin Lattice←⊥
The call site analysis also yielded the following vulnerability analysis for the second argument z:
Memory Size Lattice←⊥
Data Size Lattice←⊥
Null Terminated Lattice←⊥
String Value Lattice←⊥
Memory Location Lattice←195
Data Origin Lattice←⊥
The matching actions returned from the database 20 specify certain rules to be applied in assessing the vulnerability lattices for the call to routine strcpy( ). In the particular case of the call to strcpy the rules check that the maximum data size for the second argument is ⊥, and thus unknown. Thus, there is a possibility that the buffer can overflow. Likewise, the data origin of the second argument is ⊥, and thus unknown. Thus, there is a second possibility of a vulnerability. (If the input is unknown or external, there is the possibility of the size being too small or the input being not of internal origin which would produce a vulnerability.) In the particular case of the call to strcpy: the maximum data size for argument 2 is ⊥, so the buffer can overflow. The data origin for argument 2 is ⊥, so it can be a vulnerability. The call is marked as a vulnerability.

The embodiments described above are directed to a method of detecting buffer overflow vulnerabilities. As noted above, the method may be used to detect other vulnerabilities, such as race condition and privilege escalation.

Race Condition

As used herein, the term "race condition" means a pair of routine calls that happen sequentially in a program and which, if not performed atomically (i.e. without interruption by another thread or process on the machine), could become a vulnerability. A typical example is a call to determine the access rights of a file, and a subsequent call to write or read of that file based on the access. If the process is interrupted between the two calls and the file attributes are modified during the interruption, the second call may be reading the wrong information or writing to an inappropriate file.

The following is an exemplary code segment to be analyzed to determine whether a race condition exists. It uses access( ) and fopen( ) to illustrate a related pair of calls that could be vulnerable.

Example 3

... some code A ...
1) r=access(filename, ...)
... some code B ...
2) if(r) then
... some code C ...
3) fopen(filename, ...)
... some code D ...
In this example, there is a call to access( ) for a particular filename, followed by a test of the return value from access( ). If the test succeeds, fopen( ) is called for the same filename. Placeholders are listed for arbitrary code that could happen around the numbered statements. The fopen( ) call is reachable from the access( ) call; which means that there are no other operations on the file between the two calls, and the fopen( ) call will follow the access( ) call if the test succeeds.

While this example shows the argument to access( ) and fopen( ) as a single variable name, it is possible that the argument could be any arbitrary expression such as filename_list[i] (an entry in an array of names), or fullpath+baselen (a pointer to a character string baselen characters into fullpath). The important point is that the runtime value of that argument is the same for both calls.

As in the embodiments described above for buffer overflow conditions, a lexical analyzer is used to generate an IR for the code to be analyzed for a race condition. In this embodiment, the IR includes information about declarations in the program, and records information about identifiers in the program such as their type. It can distinguish function declarations from function calls.

Figure 12:
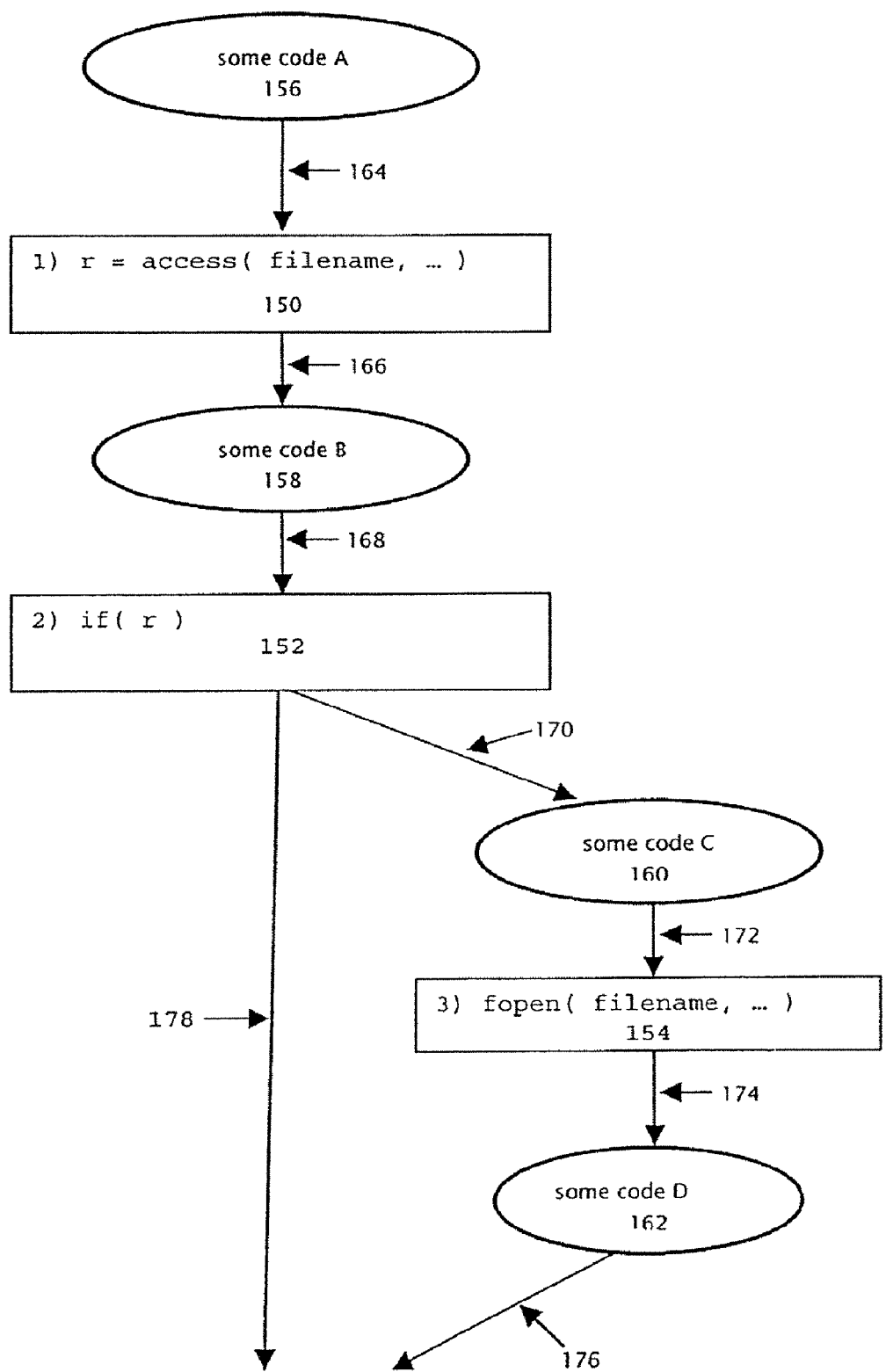
FIG. 12 shows a control flow graph according to one embodiment of the present invention.

A control flow graph is provided to show the basic block structure and the branches between the blocks which determine program control flow. An example of a control flow graph is shown in FIG. 12. The rectangular entities 150, 152, and 154 are basic blocks (contiguous, straight line statements with no branching, representing "if", "while", etc.); ovals 156, 158, 160, and 162 are regions of code with arbitrary control flow inside; and arrows 164, 166, 168, 170, 172, 174, 176 and 178 represent control flow between basic blocks or code regions.

Using the control flow graph, the system traverses backward from the block containing the open( ) call through the blocks preceding it. In the example shown, it goes to the block containing the call to access( ) and notes that the access( ) call precedes the open( ) call. Knowing that the calls are related, it examines the argument list of each call, focusing on the arguments corresponding to the filename. As a heuristic, it compares the structure of the corresponding expressions. In this example, it would find that both expressions are references to the same variable, and it would conclude that the two calls are referencing the same file and as a result, a race condition vulnerability would be flagged.

In another embodiment of a system for detecting race condition vulnerability, data flow analysis could be used with the system described above in order to provide information about the value of variables at different points in the program. For example, it could determine whether the variable filename had the same value in both the access( ) call and the fopen( ) call). Data flow analysis could also be used to determine whether an argument to access( ) described as fullpath+baselen, had the same value as an argument to fopen( ) described as filename.

Privilege Escalation

Privilege escalation vulnerabilities can arise when an application with a high level of system privileges can be made to perform actions outside of the intended design, allowing an outside party to gain privileged access to the system that they would not otherwise posses.

The following is an exemplary code segment for detection of privilege escalation.

Example 4

```
void somefunc( ){
... SetSecurityDescriptorDacl( &descriptor, TRUE,
    NULL /* ACL */, FALSE );
}
```

In this example, a Windows API call sets security attributes for a resource. The vulnerability is that a resource's ACL (access control list) should never be set to null because the resource would then be accessible or modifiable by an unauthorized user.

As in the embodiments described above, a language parser is used to create an IR from the source code. The IR provides a symbol table which includes information for all types, constants, variables and functions declared in the file. The information for function 'somefunc' includes a reference to the statements of 'somefunc.' Statements of the IR include the control flow statements of the applicable language ("if," "while," "for," etc. in C or C++) and expressions (including assignment, function calls, arithmetic operations, etc.). Function call information includes a symbol table entry for the routine being called, and a list of expressions corresponding to the arguments. A database of possible vulnerable calls is provided.

The IR is traversed, with each function definition and statement within that definition being visited. The routine being called at function call node is matched against the database information. When there is a match, the function call is looked at in greater detail.

The particular conditions which make a particular call vulnerable are previously determined. In the example shown above, it is known that that the potential issue is that the third argument to SetSecurityDescriptonDacl( ) should not be NULL. The IR for this call would point to SetSecurityDescriptorDacl as the routine being called, and there would be four entries in the list of expressions for arguments. The first would be the address of the variable 'descriptor', and the last three would be the IR constants for TRUE, NULL, and FALSE.

Finding a match with SetSecurityDescriptorDacl would trigger a deeper examination of the arguments to the call. In this case, knowledge about SetSecurityDescriptorDacl's potential vulnerability would cause an examination of the third argument. The IR directly describes this as NULL, and this call site would be flagged as vulnerable.

As described above, preferred embodiments of the invention analyze certain semantic characteristics of the source code itself to determine whether a vulnerability potentially exists. For example, arguments to a routine may be algorithmically analyzed in view of some known behavior about the routine (e.g., that a routine copies one argument to a buffer pointed to by another argument) to detect problematic calls. This approach avoids the many false positives found in known prior art approaches and proposals.

To date, security experts analyzed code using known rules to look for vulnerabilities but this was labor intensive and error prone. The invention automates the semantic analysis for vulnerabilities such as buffer overflow, race condition and privilege escalation. It also provides a framework so that as other vulnerabilities get discovered the matching actions for the detection of such may be specified and incorporated into the preferred system.

In the embodiment described above, the source code is (a) all or part of the text for an executable program written in the ANSI C language as described in the ANSI Standard X3J11, and with commonly used extensions, such as those provided by the Microsoft and GNU compiler; or (b) all or part of the text for an executable program written in the ANSI C++ language as described in the ANSI Standard X3J16, and with commonly used extensions, such as those provided by the Microsoft and GNU compilers. It is understood, however, that the invention may be used to analyze source code written in other languages as well.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

What is claimed is:

1. A computer implemented method of detecting vulnerabilities in a pre-existing source code listing, said source code listing having a listed sequence of expressions, each expression including a set of operands and operators to transform values of the operands, said listed sequence of expressions having an inherent control flow indicative of the runtime execution of the expressions and an inherent data flow indicative of the run-time transformations of operand values, said source code listing being expressable in multiple programming languages, said source code listing further having routine calls including arguments with which to invoke a routine, said source code listing being stored in a computer-readable medium, said computer implemented method comprising the acts of:

executing computer instructions to create a single intermediate representation of said source code listing regardless of programming language by parsing said source code listing;

executing computer instructions to provide a database having computer-readable records associated with pre-identified routines, each record specifying matching rules of said corresponding pre-identified routine, that, if satisfied, presents a vulnerability during execution of said routine, said database allowing new rules to be incorporated into said database corresponding to new vulnerabilities;

executing computer instructions to statically analyze said intermediate representation of said source code listing to create computer models of said source code listing, said models representing expected run time execution of a computer program created by compilation of said source code listing, said analysis including at least one of a data flow analysis, a semantic analysis and a control flow analysis;

executing computer instructions to retrieve from said database records corresponding to routine calls represented in said intermediate representation;

executing computer instructions to compare said models with said matching rules specified in said retrieved records to determine whether said routine calls possess vulnerabilities; and generating a report that identifies the detected vulnerabilities, including identifying call sites having the detected vulnerabilities, said report being viewable by a developer-user, and allowing the developer-user to address said vulnerabilities by modifying said source code listing.

2. The computer implemented method of claim 1 wherein some of said models specify the origin of data including whether said data is from an external or internal source and wherein said execution of computer instructions to statically analyze said intermediate representation includes executing instructions to determine whether external sourced data is used in an expression.

3. The computer implemented method of claim 1 wherein said execution of computer instructions to statically analyze said intermediate representation includes executing instructions to determine if the variable is visible to other routines or passed into other routines as an argument.

4. The computer implemented method of claim 1 wherein the report may identify multiple vulnerabilities for a specific call site.

* * * * *